United States Patent
Raaymakers (10) Patent No.: US 8,014,249 B2
(45) Date of Patent: Sep. 6, 2011

(54) METHOD FOR GRADUALLY CLOSING DOWN A FOCUS CONTROL LOOP OF AN OPTICAL DRIVE SYSTEM

(75) Inventor: Jeroen Arnoldus Leonardus Johannes Raaymakers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 818 days.

(21) Appl. No.: 11/993,495

(22) PCT Filed: Jun. 23, 2006

(86) PCT No.: PCT/IB2006/052042
§ 371 (c)(1), (2), (4) Date: Dec. 21, 2007

(87) PCT Pub. No.: WO2007/004095
PCT Pub. Date: Jan. 11, 2007

(65) Prior Publication Data
US 2010/0142335 A1 Jun. 10, 2010

(30) Foreign Application Priority Data
Jun. 30, 2005 (EP) .................... 05105863

(51) Int. Cl.
*G11B 7/004* (2006.01)
(52) U.S. Cl. ................. 369/53.28; 369/53.35
(58) Field of Classification Search ............... 369/44.25, 369/53.23, 53.28, 44.11, 53.35
See application file for complete search history.

(56) References Cited

U.S. PATENT DOCUMENTS

| | | | |
|---|---|---|---|
| 4,989,194 A | 1/1991 | Aoi | |
| 5,136,566 A * | 8/1992 | Iwazaki | 369/44.25 |
| 5,463,602 A | 10/1995 | Oka et al. | |
| 6,633,522 B2 * | 10/2003 | Ryu | 369/44.29 |
| 2002/0097643 A1 | 7/2002 | Kadlec et al. | |
| 2002/0101800 A1 * | 8/2002 | Kubota | 369/44.27 |
| 2003/0067850 A1 * | 4/2003 | Takahashi et al. | 369/44.29 |
| 2003/0123344 A1 | 7/2003 | Fujiune et al. | |
| 2004/0202084 A1 * | 10/2004 | Manoh et al. | 369/94 |
| 2005/0105410 A1 * | 5/2005 | Kitano et al. | 369/44.27 |
| 2005/0162999 A1 * | 7/2005 | Yamashita | 369/44.34 |

FOREIGN PATENT DOCUMENTS

| | | |
|---|---|---|
| JP | 05040941 | 2/1993 |
| JP | 2003091833 | 3/2003 |
| JP | 2004103234 | 4/2004 |
| WO | 9724717 A1 | 7/1997 |
| WO | 0143125 A2 | 6/2001 |

OTHER PUBLICATIONS

Raaymakers Jeroen: Presentation Focus Recovery and Re-Capture, Nov. 2004. Raaymakers, Jeroen: Servo Algorithms for Blue-Ray Disc Engine, VVR-43-JA-03-004.
ISR/Written Opinion of the International Searching Authority PCT/IB2006/052042.

* cited by examiner

*Primary Examiner* — Wayne R Young
*Assistant Examiner* — Thomas D Alunkal (57) ABSTRACT he present invention relates to a method for operating an optical drive system (12) capable of reproducing/recording information from/to an optical carrier (1), wherein the optical drive system includes a focus controller (PID) for controlling a focus actuator (4), and a focus memory loop (ML) for applying a stored correction signal to the focus actuator (4). The method aims at avoiding impacts between the focussing means (3) and the optical carrier (1), by gradually stopping the focus control loop in response to an event, such as a user initiated ejection of the optical carrier. The gradual stop of the focus control loop is achieved by gradually reducing a memory loop parameter of the focus memory loop (ML), and by gradually reducing a controller parameter of an integrating part (I) of the focus controller (PID). It is an advantage of the invention that the phase of the stored correction signal is synchronized with the angular position of optical carrier (1) during the gradual stopping.

13 Claims, 4 Drawing Sheets

METHOD FOR GRADUALLY CLOSING DOWN A FOCUS CONTROL LOOP OF AN OPTICAL DRIVE SYSTEM

The present invention relates to a method for operating an optical drive system capable of reproducing/recording information from/to an associated optical carrier, wherein an event requires a stop of a focus actuator control loop. The invention also relates to a corresponding optical apparatus.

Optical storage of information on optical disk media, such as CD, DVD, BD and HD-DVD, is being increasingly used in more and more applications. The information or the data is arranged in spiral-like tracks and written on and/or read from the optical disk media by a laser unit, the laser unit being positioned in an optical drive device.

The development of new optical disk media, such as the Blu-Ray disk media, and new optical drive systems being adapted so they are capable of handling the BD disk media and/or a number of different media, e.g. the CD, DVD and the BD media, has set higher requirements to the optical disk drive systems. As a result the free working distance (FWD) between the focusing lens and the optical carrier has decreased from approximately 1 mm for previous optical drive systems to approximately 0.1 mm for more recent optical drive systems such as Blu-Ray systems. The low free working distance (FWD) sets new requirements to the focus tracking systems of the optical drive system in order to avoid impacts between the disk and the focusing lens in cases where a transition from a state of focus tracking to a state of no focus tracking is required. Such a transition may be required when the disk is ejected by the user or when the host (i.e. the computer wherein the optical drive is installed/connected) requests the optical drive to stop reading or recording. It is important to avoid impacts between the disk and the focusing lens in order not to make scratches on the disk and in order not to damage the optical drive. Such optical disk drives with low free working distances (FWD) as described above, have been developed recently and the first commercial available low clearance disks have only appeared lately.

Nowadays optical drives are equipped with at focus tracking system comprising both a traditional servo controller, such as a PID controller, as well as a memory loop. The memory loop enables focus tracking of large vertical disk movements of fast spinning disks, thus, providing improved focus tracking capabilities. Such vertical disk movements are caused for example by disk skew (or higher order imperfections), turntable skew or disc unbalance and typically the disk movements have peak amplitudes in the order of 0.2 mm. The memory loop technique became required due to the development of fast spinning optical drives in the mid-nineties, and thus provides superior tracking performance relative to tracking systems equipped with only a PID controller. An example of a memory tracking system is given in WO 01/43125 to the same applicant, which is hereby incorporated by reference in its entirety. However, it is a problem to stop the focus actuator and avoid an impact between the focusing lens and the spinning disk, which exhibits large vertical movements. Hitherto, the focus tracking is stopped by simply switching the voltage applied to the focus actuator to zero volts.

JP05-040941 discloses an automatic focus setting method wherein, in the case of failure in starting the automatic focus control, a lens actuator control signal is gradually reduced from the maximum value, instead of instantaneously turning it to zero. That is, since the lens is gradually lowered vertical movements will not be generated. Consequently, at the time of re-starting the automatic focus control, the danger of failing the automatic focus setting because of the vertical movement of the lens is eliminated. Thus, JP05-040941 solves the problem of re-establishing the automatic focus setting subsequent to a failure by avoiding movements of the focusing lens. However, the method of JP05-040941 does not mention any means for focus tracking of fast spinning disks exhibiting large vertical disk movements, thus the mere gradually lowering of the lens in JP05-040941 does not provide a method for tracking the large vertical movements of a disk, and therefore JP05-040941 will not be able to solve the problem of stopping the focus actuator and avoiding an impact between the focusing lens and the spinning disk.

Hence, an improved optical drive system would be advantageous, an in particular a method for stopping the focus actuator of a low clearance optical drive so that impacts between the focusing lens and the disk are avoided.

Accordingly, the invention preferably seeks to mitigate, alleviate or eliminate one or more of the above mentioned disadvantages singly or in any combination. In particular, it may be seen as an object of the present invention to provide a method for avoiding impact between the focusing lens of the optical drive and the associated optical carrier in cases where the occurrence of an event requires a transition from a state of focus tracking to a state of no focus tracking.

This object and several other objects are obtained in a first aspect of the invention by providing a method for operating an optical drive system capable of reproducing/recording information from/to an optical carrier, wherein the optical drive system comprises:

a radiation source for generating a radiation beam,
a focusing means for focussing the radiation beam,
an optical receiver means for generating an electric read signal in response to radiation reflected from the optical carrier,
a focus tracking system for tracking the carrier with said focussed radiation beam,
wherein said focus tracking system comprises,
a focus error generating means for generating a focus error signal (FE),
a focus actuator means for changing a focus position of said focussed radiation beam relative to the optical carrier, said focus actuator means being driven by a supplied correction signal (CS), and
a correction signal generating means comprising,
a focus controller means (PID) for controlling said focus actuator, said focus controller means being supplied with said focus error signal (FE),
a focus memory loop (ML) for applying a stored correction signal to said focus actuator,
the method comprises the steps of:
a) determine if an event has occurred that requires at least a gradual stop of said focus tracking system, and if positive then,
b) disable the focus controller means (PID) by opening the control loop,
c) gradually reducing a memory loop parameter of said focus memory loop (ML), said parameter corresponding to an amplitude of said stored correction signal,
and optionally,
d) gradually reducing a controller parameter of an integrating means (I) of said focus controller means (PID), said parameter corresponding to a focus offset position.

The invention is particularly, but not exclusively, advantageous for gradually stopping the focus actuator, if an event has occurred that requires the focus actuator to be stopped, so that an impact between the focusing means, being controlled by the focus actuator, and the associated optical carrier is avoided.

The invention is particularly, but not exclusively, beneficially for disk drive systems with low free working distances (FWD). The need for such systems has arisen due to the recent development of new optical disk media, such as the Blu-Ray disk, and due to a requirement to that a single disk drive should be capable of reproducing/recording information from/to a number of different optical disk media i.e. operating with different wavelengths. To the best knowledge of the applicant this impact problem of low FWD optical drives has hitherto not been recognized in the field.

An event that may require a gradual stop of the focus actuator may be initiated by a user of the optical drive, a host i.e. a computer wherein the optical drive is connected, or a central processing unit being part of the optical drive. For instance the user may perform the action of stopping the reproducing/recording process of the optical drive. This may require the optical carrier to de-accelerate. During the de-acceleration of the optical carrier the focus actuator is required to stop in synchronization with the optical carrier, so that the tracking movements of the focusing means is gradually reduced, and possibly so that the focusing means is gradually moved away from the optical carrier, thereby avoiding an impact between the focusing means, e.g. a lens, and the optical carrier.

Other events that may require a gradual stop of the focus actuator may be a an event where a user ejects the optical carrier, a stop of recording/reading of the carrier, a stop of spinning the carrier, an event where a host sends a message to the optical drive that a reading/recoding of a data segment has ended, an event where a central processing unit of the optical drive requests the focus tracking to be stopped due to a high temperature alert, or an event where the optical drive generates a timeout after a predetermined time, e.g. 30 sec, if the host has not required data from the drive during that time.

The step of disabling the focus controller means (PID) may be carried out by opening the loop of the correction signal generating means, that is, the loop may be opened in front of the focus controller means (PID). Alternatively, the focus controller means may be disabled by setting the focus error signal FE to zero.

The step of gradually reducing a memory loop parameter of the amplifier means AML of the focus memory loop ML, has the effect that the tracking movements of the focusing means are gradually reduced so that a risk for an impact between the optical carrier and the focusing means is minimized or avoided.

The step of gradually reducing a memory loop parameter may be combined with the optional step of gradually reducing a controller parameter of an integrating means (I) of said focus controller means (PID). The effect of gradually reducing said controller parameter is that the average distance between the focusing means and the optical carrier is gradual increased, so that a risk for an impact between the optical carrier and the focusing means is minimized even more or avoided.

During the step of reducing the memory loop parameter the rate at which the stored correction signal is outputted from the memory loop ML may be synchronized with the angular position and/or the angular velocity of the optical carrier. This has the effect that the rate at which the samples of the stored correction signal is outputted may be reduced at a rate adapted to the angular speed of the optical carrier, so that the phase of the angular position of the optical carrier remains approximately equal to the phase of outputted stored correction signal. This has the advantage that the risk for an impact between the optical carrier and the focusing means is minimized even more or avoided.

Beneficially, the stored correction signal may be maintained in the memory loop (ML) during at least the duration of step c of gradually reducing said memory parameter.

Additionally or alternatively, the phase of said stored correction signal (CS) applied to said focus actuator may be substantially synchronized with the angular position of said optical carrier as this embodiment may reduce or even eliminate the risk of an impact between the optical carrier and the focusing means.

In an embodiment, the step d of gradually reducing of a controller parameter of the integrating means (I) of said focus controller means (PID) may be achieved by gradually leaking away electric charge of an integrator part of the focus controller means (PID), the integrator part (I) having a value corresponding to a focus offset position, where the focus offset position is a position of the focussed spot of the focussed radiation beam measured relative to an average position of the optical carrier, where the average position of the optical carrier should be understood as a position averaged over one or more revolutions.

In an alternative embodiment, the step d of gradually reducing of a controller parameter of the integrating means (I) of said focus controller means (PID) may be achieved by gradually reducing a digitally controlled parameter of the integrator part (I) of the focus controller means (PID), the digitally controlled parameter having a value corresponding to a focus offset position. Thus, if the optical drive has a digitally implementation of the focus control system the present invention is readily incorporated into such a control system.

Beneficially, the controller parameter indicative of a focus offset position is gradually reduced or gradually increased to a negative or positive value, respectively, so as to move the focussing means, e.g. the lens, further away from the optical carrier. Thus, by gradually reducing (increasing) the controller parameter from an initial positive (negative) parameter value to a zero value and then further gradually reducing (increasing) the controller parameter from the zero value to a negative (positive) value the focussing means may be displaced away from the carrier in a fast and controllable fashion by varying the rate of change of the controller parameter.

In a particular embodiment, the step c of gradually reducing a memory loop parameter of an amplifier means (AML) of said focus memory loop (ML) may be achieved by gradually reducing the amplification of said stored focus control signal being applied to said focus actuator as the amplifier means (AML) provides a relatively easy implementation of reducing the memory loop parameter.

The period of time in which the memory loop parameter of the focus memory loop is reduced a certain amount and/or the period of time in which the controller parameter of the integrating means of the focus controller means (PID) is reduced a certain amount, may be adapted to be longer than the reciprocal value of the lowest natural frequency of the focus actuator means, e.g. the natural frequency of the focus actuator. An advantage of this embodiment is that transient vibrations of the focus actuator are avoided so as to facilitate that the risk of impacts between the optical carrier and the focussing means is greatly reduced.

In a second aspect, the present invention relates to an optical drive system capable of reproducing/recording information from/to an associated optical carrier 1, wherein the apparatus comprises:

a radiation source for generating a radiation beam,
a focusing means for focussing the radiation beam, an optical receiver means for generating an electric read signal in response to radiation reflected from the optical carrier, a focus tracking system for tracking the carrier with said focussed radiation beam, wherein said focus tracking system comprises a focus error generating means for generating a focus error signal (FE), a focus actuator means for changing a focus position of said focussed radiation beam relative to the optical carrier, said focus actuator means being driven by a supplied correction signal (CS), and a correction signal generating means comprising a focus controller means (PID) for controlling said focus actuator, and, said focus controller means being supplied with said focus error signal (FE), and a focus memory loop (ML) for applying a stored correction signal to said focus actuator, and the apparatus further comprises:

a) event detection means for generating a signal indicative of the occurrence of an event that requires at least a gradual stop of said focus tracking system, b) switching means for disabling the focus controller means (PID) by opening the control loop, c) adjusting means for gradually reducing a memory loop parameter of said focus memory loop (ML), said parameter corresponding to an amplitude of said stored correction signal, and optionally, d) adjusting means for reducing a controller parameter of an integrating means (I) of said focus controller means (PID), said parameter corresponding to a focus offset position.

It is an advantage of the present invention that the position movements of the focussing means relative to a spinning optical carrier may be gradually be reduced, thereby avoiding impacts between the optical carrier and the focussing means when a stop of the focus actuator means is required. It is a further advantage that the position movements of the focussing means may be gradually reduced in synchronization with the optical carrier, so that the phase of the stored correction signal (CS) applied to said focus actuator means is substantially synchronized with the angular position of the optical carrier, thereby avoiding impacts between the optical carrier and the focussing means during the de-acceleration of the optical carrier after a stop of the focus actuator means has been required.

In a third aspect, the invention relates to a computer program product being adapted to enable a computer system comprising at least one computer having data storage means associated therewith to control an optical drive system according to the first aspect of the invention.

This aspect of the invention is particularly, but not exclusively, advantageous in that the present invention may be implemented by a computer program product enabling a computer system to perform the operations of the first aspect of the invention. Thus, it is contemplated that some known optical drive system may be changed to operate according to the present invention by installing a computer program product on a computer system controlling the said optical drive system. Such a computer program product may be provided on any kind of computer readable medium, e.g. magnetically or optically based medium, or through a computer based network, e.g. the Internet.

The first, second and third aspect of the present invention may each be combined with any of the other aspects. These and other aspects of the invention will be apparent from and elucidated with reference to the embodiments described hereinafter.

The present invention will now be explained, by way of example only, with reference to the accompanying Figures, where.

The invention provides a method for avoiding impacts between the disk and the focusing lens 3 of an optical drive system capable of reproducing information from an associated optical carrier 1 and/or recording information on an associated optical carrier 1.

The avoidance of generating impacts is particularly related to the situation where the focus actuator 4 needs to be stopped, such as when a transition from focus tracking to no focus tracking is required for instance where the carrier 1 needs to be ejected from the optical disk drive.

Figure 1:
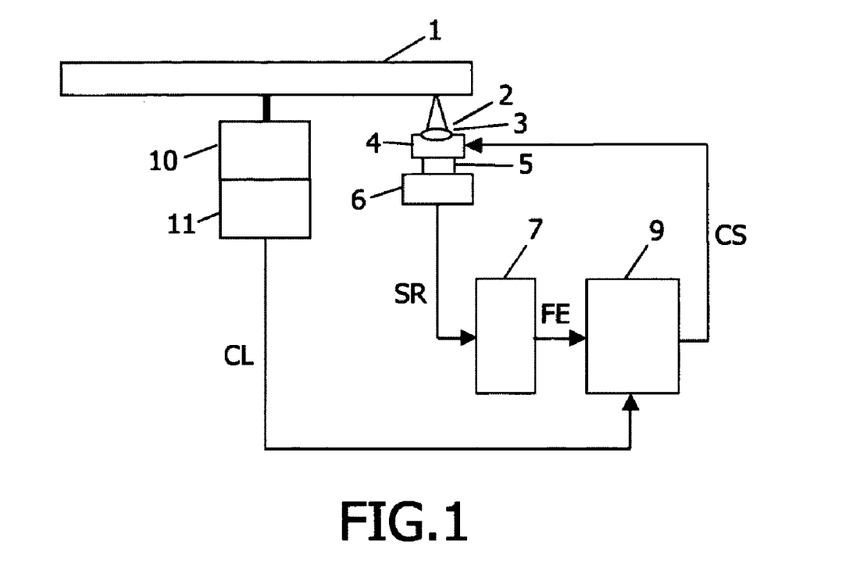
FIG. 1 illustrates a focus tracking system for controlling a focus actuator of an optical drive system.

FIG. 1 illustrates the optical drive system 12 capable of reproducing/recording information from/to an optical carrier 1 such as an optical disk. The optical drive system comprises a radiation source 5 such as a laser for generating an optical beam transmitted through a focusing means 3, such as a lens for focussing the radiation beam onto the carrier 1. The optical drive system further comprises optical receiver means 6 such as a segmented photo detector for generating an electric read signal SR in response to the radiation reflected from the optical carrier 1. The optical drive system also comprises a focus tracking system for tracking the carrier 1 with the focussed radiation beam 2. The focus tracking system comprises a focus error generating means 7 for generating a focus error signal FE that is the difference signal of a focus position signal and a reference focus position. The focus error signal FE is applied to the correction signal generating means 9, which outputs a correction signal CS that is applied to the focus actuator means 4. The optical drive system 12 also comprises rotating means 10, such as an electric motor, for rotating the optical carrier 1. The optical drive 12 further comprises a phase detecting means 11, such as an encoder, which generates a clock signal CL that is indicative of the phase, that is, the angular position of the rotating means 11 and thereby also the optical carrier 1. The clock signal CL is applied to the correction signal generating means 9 for synchronization purposes.

Figure 2:
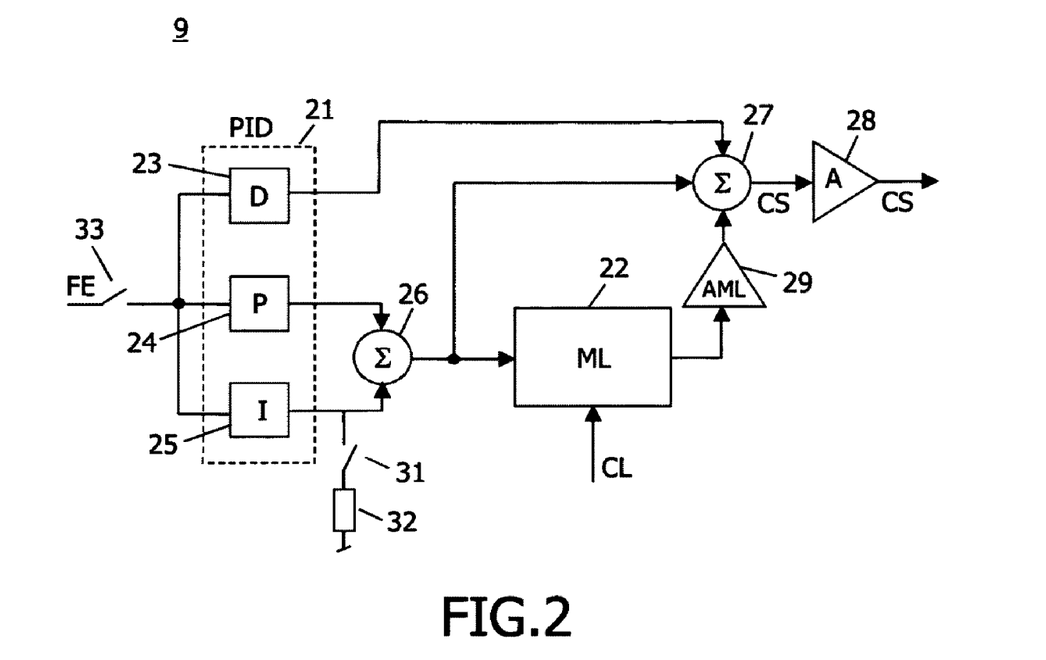
FIG. 2 illustrates a correction signal generating means for generation of a correction signal applied to the focus actuator.

FIG. 2 illustrates the correction signal generating means 9 in greater detail. Thus, the correction signal generating means 9 comprises a focus controller means PID, known as a PID controller, and a focus memory loop ML 22. The focus error signal FE is applied to the focus controller means 21 which comprises differentiation means 23, D for differentiating the focus error signal FE, proportional amplification means 24, P for amplifying the focus error signal FE, and integration means 25, I for integrating the focus error signal FE. Amplifiers may be integrated with the differentiation means 23, D and the integration means 25, I in order to control the strength of the differentiating action and the integration action by amplifying the focus error signal FE. The outputs of the proportional amplification means 24, and integration means 25 are added in summation means 26, and subsequently the sum is outputted from summation means 26 and inputted to another summation means 27 and added with the output from the differentiation means 23.

In another branch of the correction signal generating means 9, the output from the summation means 26 is applied to the memory loop 22. The memory loop comprises storage means for storing a signal that corresponds with the harmonic components (typically the first harmonic up to the eight harmonic) of the correction signal CS. The duration of the signal stored in the memory loop is equal to or approximately equal to the duration of one or more rotations of the optical carrier 1. The signal stored in the memory loop may be in the form of a number N of samples, e.g. N=128 samples. The stored samples are outputted from the memory loop ML 22 so that the outputted samples from the memory loop seek to reduce the previously generated focus error FE values to zero. Furthermore, the output signal from the memory loop ML contains the harmonic components, i.e. the AC components, but the output signal does not contain any DC components; the DC components are generated and outputted from the integration means 25, I. The function of a memory loop is known from prior art, for example as disclosed in WO 01/43125.

The output from the memory loop ML 22 is inputted to the summation means 27 (via amplifier means 29), so that the output of the summation means is equal to the sum of the signal from the output of memory loop ML 22, and the outputs of the differentiation means 23, the proportional amplification means 24, and the integration means 25. The output of the summation means CS is optionally amplified by amplifier means A 28 before being applied to the focus actuator means 4. Both the signal outputted from the summation means 27 and the signal outputted from the amplifier means 28 is referred to as the correction signal CS, because the amplifier 28 could be omitted or integrated elsewhere in the correction signal generation means 9. Thus, a part of the correction signal CS is generated by the memory loop ML and another part of the correction signal CS is generated by the focus controller PID.

The memory loop ML 22 is synchronized with the rotating means 10, and thereby also the optical carrier 1 by means of a synchronization signal CL generated by the phase detecting means 11. Thus, the samples of the memory loop are always outputted at a rate and phase that corresponds to the rotational speed and phase (angle) of the optical carrier 1.

During the use of the optical drive 9, an event may occur that requires a transition from a state of focus tracking to a state of no focus tracking wherein the no focus tracking state requires the focus actuator 4 to stop. Such an event may be initiated by a user of the optical drive 12, a host i.e. a computer wherein the optical drive 9 is connected, or a central processing unit being part of the optical drive. For instance the user may perform the action of stopping the reproducing/recording process of the optical drive. This will require the optical carrier 1 to de-accelerate. During the de-acceleration of the optical carrier 1 the focus actuator is required to stop in a controlled fashion so that an impact between the optical carrier 1 and the focusing means 3 is avoided.

The method according to the present invention that aims at stopping the focus lens 3 in a controlled fashion will be described in relation to FIG. 1 and FIG. 2. First it is determined if an event has occurred, such as the user initiated stop of a reproducing/recording process of the optical drive. If this determining step results in a positive answer the focus controller means PID is disabled by opening the control loop by opening the switch 33 or by setting the focus error signal to zero. Effectively, both ways for disabling the controller PID are equivalent since the action of opening the switch 33 forces the input of the controller PID to zero due to a pull down resistor connected to the input of the controller PID (not shown). At the same time as the focus controller means PID is disabled, the memory loop ML is put on hold, that is, the memory loop will stop updating the stored content and the stored content of the memory loop ML will be maintained.

Thus after the controller PID has been disabled the outputs from the differentiating means 23 and the proportional amplifying means 24 are zero. The output of the integrating means 25 may not be equal to zero due to an integrated value. Thus the correcting signal being outputted from the amplifier means 28 consists of the integrated value being outputted from the integrating means 25 and the output from the memory loop ML 22.

Now, the step of gradually reducing the amplitude of the signal outputted from the memory loop ML 22 is initiated. The reduction of the amplitude implies reduced tracking movement amplitude of the focus actuator 4 and correspondingly reduced movement amplitude of the focusing means 3. The reduction of the amplitude of the output of the memory loop ML is achieved by reducing the amplification of the amplifier means 29. Thus, when the amplification of the amplifier means 29 has been reduced to zero the focus actuator 4 substantially no more exhibits cyclic tracking movements.

Instead of using the amplifier means 29, the amplifier means 28 may be used for reducing the amplitude. In this case, both the amplitude of the signal outputted from the memory loop ML 22 and the signal outputted from the integrating means will be reduced simultaneously. Therefore, the amplifier means 29 may be omitted. Alternatively, the amplitude of the signal outputted from the memory loop ML 22 may be reduced by individually reducing the amplitude of each of the N stored samples by reducing the amplification of each of the N amplifiers connected to each of the N sample-storage means of the memory loop ML 22 (not shown).

The amplitude of the signal outputted from the memory loop ML 22 may be reduced as a function of time, where the function is a linear function of time, or where the function is an exponential function of time, or where the function is an polynomial function of time.

During the period of reducing the amplitude of the signal outputted from the memory loop ML, the rate at which samples are outputted from the memory loop ML are synchronized with the angular speed and angular position of the optical carrier 1.

Furthermore, during the period of reducing of the amplitude of the signal outputted from the memory loop ML, the signal stored in the memory loop ML, is maintained. That is, the samples of the signal stored in the memory loop ML is not updated during the period of reducing of the amplitude of the signal outputted from the memory loop ML.

Simultaneously, with the step of gradually reducing the amplitude of the signal outputted from the memory loop ML, the step of reducing the controller parameter of the integrating means I, 25 is preferably carried out. Alternatively, the step of reducing the controller parameter of the integrating means I, 25 is not carried out simultaneously with the step of gradually reducing the amplitude of the signal outputted from the memory loop ML, but the step of reducing the controller parameter of the integrating means I, 25 may be initiated some period of time prior to, or subsequent to, the initiation of the step of gradually reducing the amplitude of the signal outputted from the memory loop ML. Also, the step of reducing the controller parameter of the integrating means (I), 25 may be chosen not to be carried out.

The step of gradually reducing the controller parameter of the integrating means I, 25 may be achieved by gradually leaking away electric charge of the integrating means I, 25 by closing the switch 31 in FIG. 2 so that an electric current will flow through the discharging resistor 32 in FIG. 2. Thereby the amplitude of the signal outputted from integrating means I, 25 will gradually reduce to zero. If the integrating means I, 25 is a digitally integrating device, such as a central processing unit, the step of gradually reducing the controller parameter of the integrating means I, 25 may be achieved by gradually reducing a digitally controlled parameter of the integrating means I, 25 so that the amplitude of the signal outputted from integrating means will gradually reduce to zero.

Instead of reducing the controller parameter of the integrating means I, 25 it is possible to achieve the same effect that will move the focusing means 2 away from the optical carrier 1 by gradually reducing the amplification of the amplifier means 28. In that way both the step of gradually reducing the controller parameter of the integrating means I, 25 and the step of step of gradually reducing the amplitude of the signal outputted from the memory loop ML 22 may be achieved by gradually reducing the amplification of the amplifier means 28.

The gradual reduction of the controller parameter of the integrating means I, 25 may be reduced as a function of time, where the function is a linear function of time, or where the function is an exponential function of time, or where the function is an polynomial function of time.

The value of the controller parameter of the integrating means I, 25 is equivalent to a slowly varying DC component of the correction signal CS applied to the focus actuator 4. Thus, the controller parameter of the integrating means I, 25 corresponds to a position of the focus lens 3 relative to a fixed point, for instance a non-moving part of the focus actuator 4, which again corresponds to a focus offset position of the focussed spot of the focussed radiation beam 2 relative to an average position of the optical carrier 1. Therefore, when the controller parameter of the integrating means I, 25 is reduced from a positive value to zero the focus offset position will reduce to zero so that the focussed spot of the focussed radiation beam 2, and correspondingly the focusing means 3, will move in a direction away from the optical carrier 1. Also, the controller parameter of the integrating means I, 25 may be reduced to a negative value in order to move the focusing means 3 further away from the optical carrier 1. It is to be understood that the controller parameter of the integrating means I, 25 could also have an initial negative value in which case the controller parameter of the integrating means I, 25 is increased from a negative value to zero, and then optionally increased to a positive value in order to move the focusing means 3 further away form the optical carrier 1.

Figure 3:
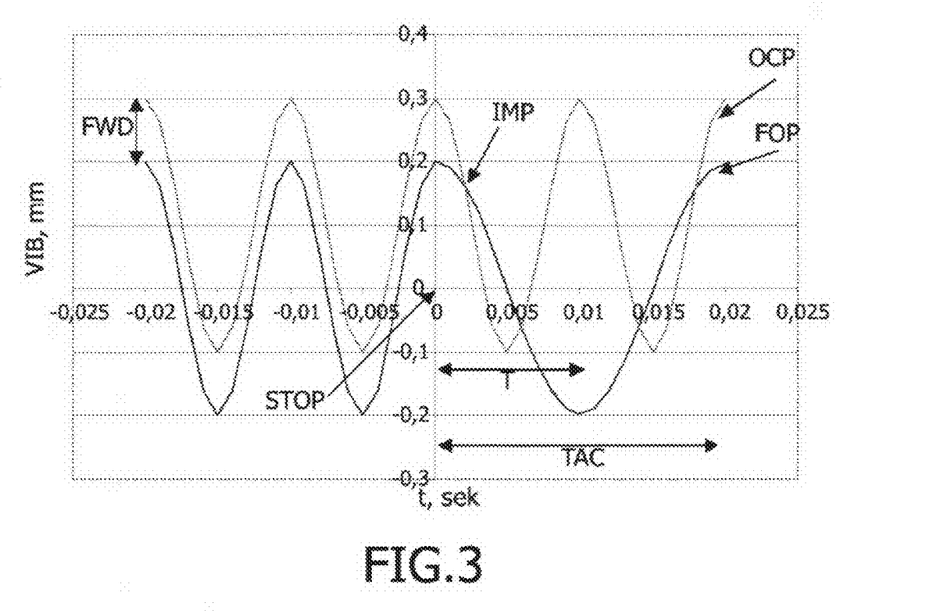
FIG. 3 illustrates an example of stopping the focus actuator by switching the correction signal to zero.

FIG. 3 illustrates an example of stopping the focus actuator 4 by switching correction signal CS applied to the actuator to zero. In FIG. 3, the curve OCP (optical carrier position) illustrates the relative position of an optical carrier 1 which is moving due to disk skew and turntable skew. The curve FOP (focus means position) illustrates the relative position of the focusing means 3 being moved by the focus actuator 4. The abscissa shows the time t in seconds and the ordinate shows the position of movement VIB (in millimeters mm) relative to a fixed point, where the fixed point may be chosen arbitrarily. Up to the time t=0 (indicated in FIG. 3 with STOP) where the focus actuator 4 is stopped by switching the correction signal CS applied to the actuator to zero, the focusing means 3 tracks the optical carrier 1 with a constant free working distance FWD of 0.1 mm. In the period following after the focus actuator 4 has been stopped, the optical carrier 1 continues to move cyclic up and down with the same frequency given by 1/T, whereas the vibrations of the focusing means 3 exhibits a transient behaviour with a exponential decreasing vibration amplitude and frequency given by 1/TAC. The vibration period T is equal to the duration of one rotation of the optical carrier, and the vibration period TAC is the reciprocal of the natural frequency of the focus actuator 4. At the instant indicated with IMP the focusing means impacts the optical carrier 1. The curves OCP and FOP after the impact will therefore have another appearance than shown in FIG. 3.

The curve FOP in FIG. 3 illustrates a solution to a homogeneous linear second order differential equation describing the positional relation for a spring-mass system comprising the focus actuator means 4. The curves FOP in FIGS. 4-7 illustrate solutions to a non-homogeneous linear second order differential equation describing the relation between position and excitation force for spring-mass system comprising the focus actuator means 4, and being excited with a force containing harmonic components. The curves in FIGS. 3-7 should not be understood as exact solutions of the relevant differential equations, rather the curves only represent illustrations of the exact mathematical solutions, where the exact mathematical solutions are known to the skilled person in the art.

Figure 4:
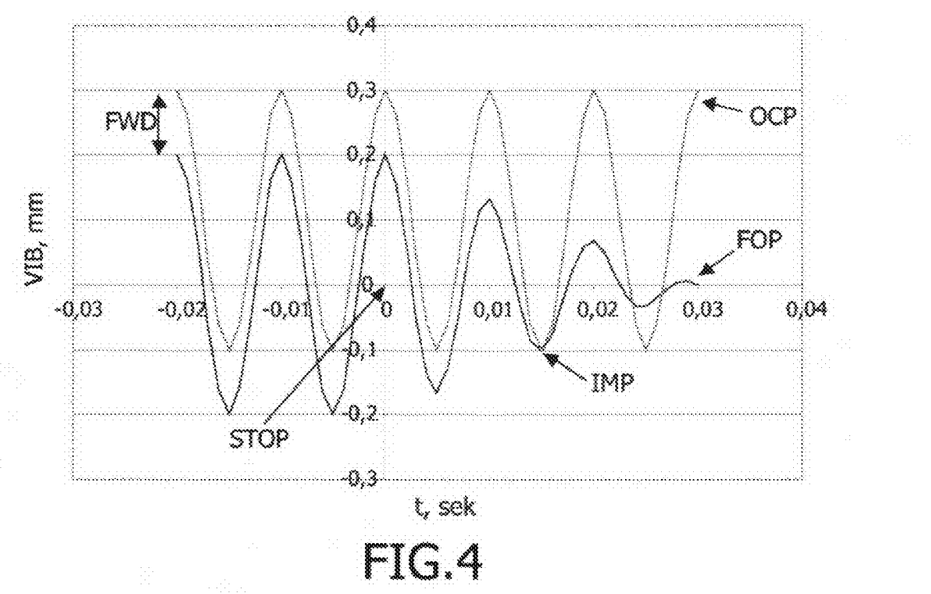
FIG. 4 illustrates an example of gradually reducing the amplitude of a signal outputted from a memory loop.

FIG. 4 illustrates an example where only the step of gradually reducing the amplitude of the signal outputted from the memory loop ML is carried out after an event has occurred at time t=0 that requires the focus actuator 4 to stop. The movement amplitude of the focusing means 3, shown as the curve FOP, decreases linearly and has a frequency equal to the rotation frequency of the optical carrier 1. However, at the instant indicated with IMP the focusing means impacts the optical carrier 1.

Figure 5:
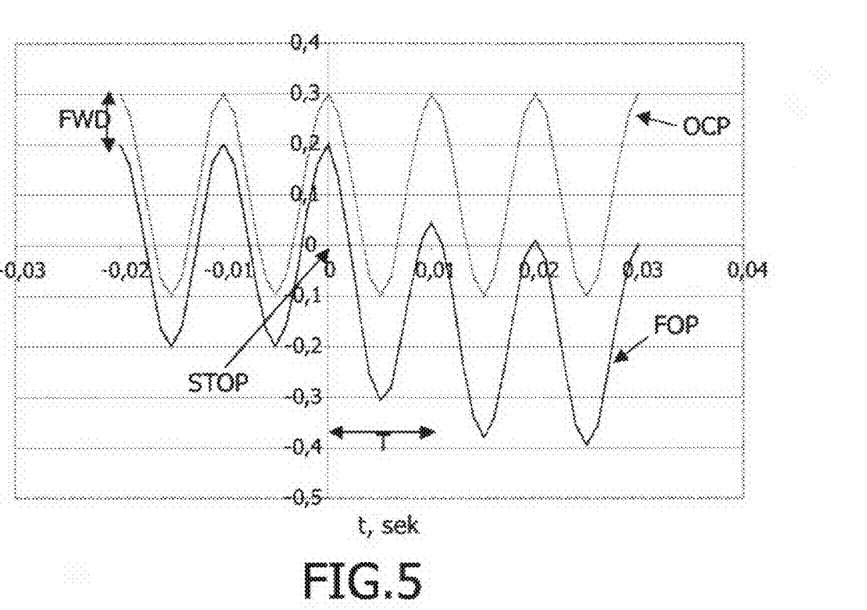
FIG. 5 illustrates an example of gradually reducing a controller parameter of an integrating means of a focus controller.

FIG. 5 illustrates an example where only the step of gradually reducing the controller parameter of the integrating means I, 25 is carried out after an event has occurred at time t=0 that requires the focus actuator 4 to stop. As the parameter of the integrating means I, 25 is reduced, the output of the integrating means I, 25 is reduced correspondingly which increases the average distance between the carrier 1 and the focusing means 3 with 0.2 mm which is seen from the curve FOP. However, the focusing means 3 is not brought to a stop because the amplitude of the signal outputted from the memory loop ML has not been reduced.

Figure 6:
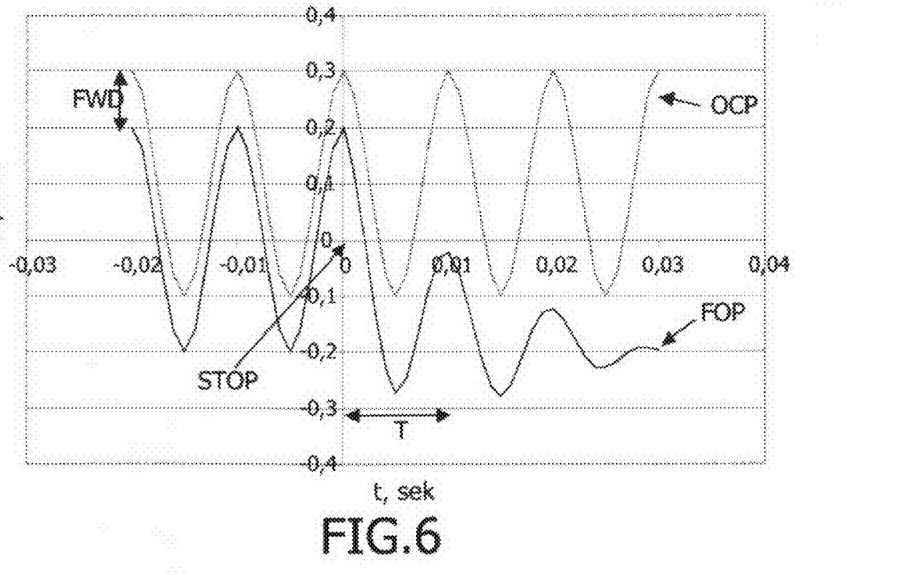
FIG. 6 illustrates an example of gradually stopping a focus actuator, by gradually reducing the amplitude of a signal outputted from the memory loop, and simultaneously reducing a controller parameter of an integrating means of a focus controller.

FIG. 6 illustrates an example where both the step of gradually reducing the amplitude of the signal outputted from the memory loop ML and the step of gradually reducing the controller parameter of the integrating means I, 25 is carried out after an event has occurred at time t=0 that requires the focus actuator 4 to stop. The curve FOP of FIG. 6 shows that the movement amplitude of the focusing means 3 decreases gradually simultaneously with the gradual decrease of the parameter of the integrating means I, 25. Thus, at time t=0.03 the focus actuator has been stopped; however the optical carrier 1 is still rotating.

Figure 7:
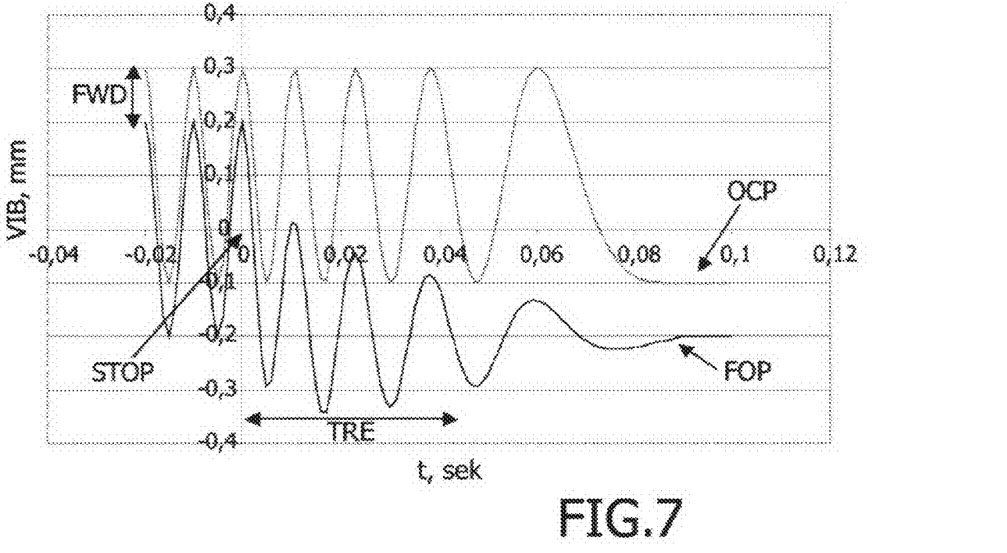
FIG. 7 illustrates an example of gradually stopping a focus actuator and reducing the rotational speed of an optical carrier.

FIG. 7 illustrates an example where both the step of gradually reducing the amplitude of the signal outputted from the memory loop ML and the step of gradually reducing the controller parameter of the integrating means I, 25 is carried out and where the rotational speed of the optical carrier is reduced to zero. The gradual increase of the frequency of the curve OCP shows that the rotational speed of the carrier 1 is reduced from a maximum at time t=0 to zero at time t=0.9. The frequency of the signal outputted from the memory loop ML is synchronized with the angular velocity and angular position of the optical carrier 1 which is shown by the curves FOP and OCP. Thus, at the time t=0.9 both the optical carrier 1 and the focus actuator 4 have been stopped.

In some embodiment, the rate at which the controller parameter of the integrating means I, 25 is reduced is adapted to the lowest natural frequency of the focus actuator 4 in order to avoid excitation of natural vibration modes of the focus actuator 4. Therefore, the duration of the period TRE, shown in FIG. 7, in which the controller parameter of the integrating means I, 25 is reduced by 70% relative to the initial value at time t=0 should be longer than the vibration period TAC of the lowest natural frequency of the focus actuator 4, as shown in FIG. 4. The fraction given by the ratio TRE/TAC can be in the range from 1 to 7, preferably in the range from 2 to 6, or more preferably in the range from 3 to 5, where TRE describes the decay of the signal outputted from the integrating means I, 25.

Also, the rate at which the amplitude of the signal outputted from the memory loop ML is reduced is adapted to the lowest natural frequency of the focus actuator 4 in order to avoid excitation of natural vibration modes of the focus actuator 4. The period TRE shown in FIG. 7 also describes the duration of the period in which the amplitude of the signal outputted from the memory loop ML is reduced by 70% relative to the initial value a time t=0. Therefore, the fraction given by the ratio TRE/TAC can be in the range from 1 to 7, preferably in the range from 2 to 6, or more preferably in the range from 3 to 5, where TRE describes the decay of the amplitude of the signal outputted from the memory loop ML.

Figure 8:
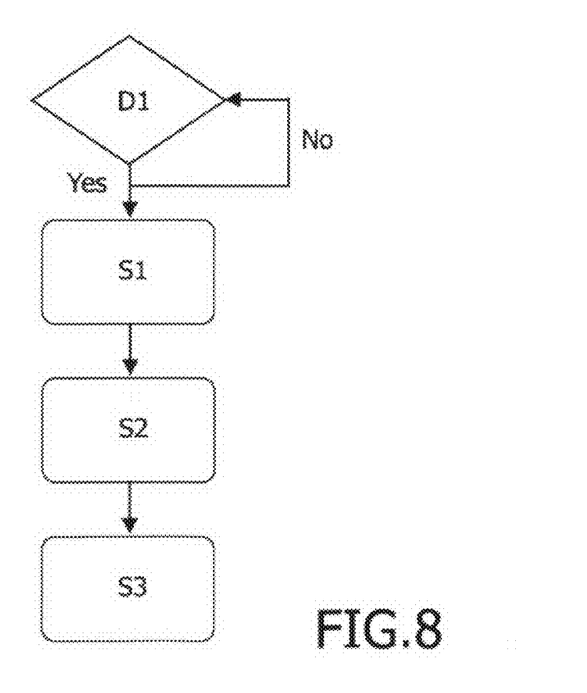
FIG. 8 is flow-chart for illustrating the method according to the invention.

FIG. 8 is flow-chart for illustrating the method according to the invention.

In a first decision step D1, it is determined if an event has occurred that requires at least a gradual stop of said focus tracking system, and if positive then proceed step S1, and if negative return to decision step D1.

In a first step S1, the focus controller means PID are disabled by carrying out at least one of the activities selected from the group of open the control loop, and set the focus error signal FE to zero.

In a second step S2, the memory loop parameter of the amplifier means AML of the focus memory loop ML is gradually reduced, said parameter corresponding to an amplitude of said stored correction signal.

In a third step S3, the controller parameter of the integrating means I, 25 of said focus controller means PID is gradually reduced, said parameter corresponding to a focus offset position.

According to the invention step S2 and step S3 may be initiated simultaneously or any of the states S2 and S3 may be initiated a period of time prior to the other, where the period of time may be in range from 1 microsecond to 10 millisecond.

Although the present invention has been described in connection with the specified embodiments, it is not intended to be limited to the specific form set forth herein. Rather, the scope of the present invention is limited only by the accompanying claims. In the claims, the term comprising does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for operating an optical drive system capable of reproducing/recording information from/to an optical carrier, wherein the optical drive system comprises:
   a radiation source for generating a radiation beam,
   a focusing means for focussing the radiation beam,
   an optical receiver means for generating an electric read signal in response to radiation reflected from the optical carrier,
   a focus tracking system for tracking the carrier with said focussed radiation beam,
   wherein said focus tracking system comprises
      a focus error generating means for generating a focus error signal,
      a focus actuator means for changing a focus position of said focussed radiation beam relative to the optical carrier, said focus actuator means being driven by a supplied correction signal, and
      a correction signal generating means comprising
         a focus controller means for controlling said focus actuator, and, said focus controller means being supplied with said focus error signal, and
         a focus memory loop for applying a stored correction signal to said focus actuator,
   the method comprises the steps of:
   a) determine if an event has occurred that requires at least a gradual stop of said focus tracking system, and if positive then,
   b) disable the focus controller means by opening the control loop, and
   c) gradually reducing, over a period of time, at least one of: a memory loop parameter of said focus memory loop, said parameter corresponding to an amplitude of said stored correction signal, and
      a controller parameter of an integrating means of said focus controller means, said controller parameter corresponding to a focus offset position, wherein the period of time is determined based on a natural frequency of the focus actuator means.

2. A method according to claim 1, wherein said stored correction signal is maintained in the memory loop during at least the duration of step c of gradually reducing said memory parameter.

3. A method according to claim 1, wherein the occurrence of said event of step a is an event selected from the group comprising: An ejection of the carrier from the optical drive system, a stop of recording/reading of the carrier, and a stop of spinning the carrier.

4. A method according to claim 1, wherein the step of gradually reducing a controller parameter of the integrating means of said focus controller means comprises gradually leaking away electric charge of an integrator part of the focus controller means, said integrator part having a value corresponding to a focus offset position.

5. A method according to claim 1, wherein the step of gradually reducing a controller parameter of the integrating means of said focus controller means comprises gradually reducing a digitally controlled parameter of an integrator part of the focus controller means, said digitally controlled parameter having a value corresponding to a focus offset position.

6. A method according to claim 4, wherein said controller parameter indicative of a focus offset position is gradually reduced or gradually increased to a negative or positive value, respectively, so as to move the focussing means further away from the optical carrier.

7. A method according to claim 1, wherein the step of gradually reducing a memory loop parameter of an amplifier means of said focus memory loop, is achieved by gradually reducing the amplification of said stored focus control signal being applied to said focus actuator.

8. A method according to claim 1, wherein a phase of said stored correction signal applied to said focus actuator is substantially synchronized with the angular position of said optical carrier.

9. A method according to claim 1, wherein the period of time in which said memory loop parameter of said amplifier means of said focus memory loop is reduced a certain amount, and/or the period of time in which said controller parameter of said integrating means of said focus controller means is reduced a certain amount, is adapted to be longer than the reciprocal value of the lowest natural frequency of said focus actuator means.

10. An apparatus for operating an optical drive system capable of reproducing/recording information from/to an associated optical carrier, wherein the apparatus comprises:
a radiation source for generating a radiation beam,
a focusing means for focussing the radiation beam,
an optical receiver means for generating an electric read, signal in response to radiation reflected from the optical carrier,
a focus tracking system for tracking the carrier with said focussed radiation beam,
wherein said focus tracking system comprises
a focus error generating means for generating a focus error signal,
a focus actuator means for changing a focus position of said focussed radiation beam relative to the optical carrier, said focus actuator means being driven by a supplied correction signal, and
a correction signal generating means comprising
a focus controller means for controlling said focus actuator, and, said focus controller means being supplied with said focus error signal, and
a focus memory loop for applying a stored correction signal to said focus actuator,
and the apparatus further comprises:
a) event detection means for generating a signal indicative of the occurrence of an event that requires at least a gradual stop of said focus tracking system,
b) switching means for disabling the focus controller means by opening the control loop,
c) adjusting means for gradually reducing, over a period of time, at least one of: a memory loop parameter of said focus memory loop, said parameter corresponding to an amplitude of said stored correction signal, and
a controller parameter of an integrating means of said focus controller means, said controller parameter corresponding to a focus offset position, wherein the period of time is determined based on a natural frequency of the focus actuator means.

11. A non-transitory computer program product being adapted to enable a computer system comprising at least one computer having data storage means associated therewith to control an optical drive system comprising a radiation source, a focusing means, an optical receiver means and a focus tracking system comprising a focus error generating means, a focus actuator means and a correction signal generating means comprising a focus controller means for controlling said focus actuator, and, said focus controller means being supplied with said focus error signal, and a focus memory loop for applying a stored correction signal to said focus actuator, said computer system executing the steps of:
a) determining if an event has occurred that requires at least a gradual stop of said focus tracking system, and if positive then,
b) disabling the focus controller means by opening the control loop, and
c) gradually reducing, over a period of time, at least one of: a memory loop parameter of said focus memory loop, said parameter corresponding to an amplitude of said stored correction signal, and a controller parameter of an integrating means of said focus controller means, said controller parameter corresponding to a focus offset position, wherein the period of time is determined based on a natural frequency of the focus actuator means.

12. A method for operating an optical drive system capable of reproducing/recording information from/to an optical carrier, wherein the optical drive system comprises:
a radiation source for generating a radiation beam,
a focusing means for focussing the radiation beam,
an optical receiver means for generating an electric read signal in response to radiation reflected from the optical carrier,
a focus tracking system for tracking the carrier with said focussed radiation beam,
wherein said focus tracking system comprises
a focus error generating means for generating a focus error signal,
a focus actuator means for changing a focus position of said focussed radiation beam relative to the optical carrier, said focus actuator means being driven by a supplied correction signal, and
a correction signal generating means comprising
a focus controller means for controlling said focus actuator, and, said focus controller means being supplied with said focus error signal, and
a focus memory loop for applying a stored correction signal to said focus actuator,
the method comprises the steps of:
a) determine if an event has occurred that requires at least a gradual stop of said focus tracking system, and if positive then,
b) disable the focus controller means by opening the control loop, and
c) gradually reducing at least one of: a memory loop parameter of said focus memory loop, said memory loop parameter corresponding to an amplitude of said stored correction signal, and a controller parameter of an integrating means of said focus controller means, the controller parameter being gradually reduced by leaking away electric charge of an integrator part of the focus controller means, said integrator part having a value corresponding to a focus offset position.

13. A method for operating an optical drive system capable of reproducing/recording information from/to an optical carrier, wherein the optical drive system comprises:
a radiation source for generating a radiation beam,
a focusing means for focussing the radiation beam,
an optical receiver means for generating an electric read signal in response to radiation reflected from the optical carrier,
a focus tracking system for tracking the carrier with said focussed radiation beam, wherein said focus tracking system comprises
- a focus error generating means for generating a focus error signal,
- a focus actuator means for changing a focus position of said focussed radiation beam relative to the optical carrier, said focus actuator means being driven by a supplied correction signal, and
- a correction signal generating means comprising
  - a focus controller means for controlling said focus actuator, and, said focus controller means being supplied with said focus error signal, and
  - a focus memory loop for applying a stored correction signal to said focus actuator, the method comprises the steps of:

a) determine if an event has occurred that requires at least a gradual stop of said focus tracking system, and if positive then,
b) disable the focus controller means by opening the control loop, and
c) gradually reducing at least one of: a memory loop parameter of said focus memory loop, said memory loop parameter corresponding to an amplitude of said stored correction signal, and a controller parameter of an integrating means of said focus controller means, the controller parameter being gradually reduced by reducing a digitally controlled parameter of an integrator part of the focus controller means, said digitally controlled parameter having a value corresponding to a focus offset position.

* * * * *